United States Patent
Brown

(10) Patent No.: US 8,994,581 B1
(45) Date of Patent: Mar. 31, 2015

(54) DIRECTION OF ARRIVAL (DOA) ESTIMATION USING MULTIPLE OFFSET RECEIVE CHANNELS

(71) Applicant: Adam Brown, Mountain View, CA (US)

(72) Inventor: Adam Brown, Mountain View, CA (US)

(*) Notice: Subject to any disclaimer, the term of this patent is extended or adjusted under 35 U.S.C. 154(b) by 316 days.

(21) Appl. No.: 13/626,647

(22) Filed: Sep. 25, 2012

(51) Int. Cl.
*G01S 13/42* (2006.01)
*G01S 13/44* (2006.01)
*G01S 13/93* (2006.01)
*G01S 13/86* (2006.01)

(52) U.S. Cl.
CPC ........... *G01S 13/4463* (2013.01); *G01S 13/931* (2013.01); *G01S 13/865* (2013.01)
USPC ............. 342/83; 342/127; 342/133; 342/139; 342/146; 342/149

(58) Field of Classification Search
CPC ..... G01S 13/4463; G01S 13/865; G01S 3/48; G01S 13/931; G01S 13/4454; G01S 3/74; H01Q 21/06; H01Q 21/08
USPC ............. 342/83, 85, 127, 133, 139, 146–158, 342/417, 424, 427, 446
See application file for complete search history.

(56) References Cited

U.S. PATENT DOCUMENTS

| | | | | |
|---|---|---|---|---|
| 4,467,328 | A | * | 8/1984 | Hacker ........................... 342/14 |
| 4,780,722 | A | * | 10/1988 | Cusdin .......................... 342/437 |
| 5,812,091 | A | * | 9/1998 | Robinson ...................... 342/424 |
| 6,313,794 | B1 | * | 11/2001 | Rose .............................. 342/424 |
| 7,477,192 | B1 | | 1/2009 | Haff et al. |
| 7,613,482 | B2 | | 11/2009 | Liu |
| 8,019,285 | B2 | | 9/2011 | Nakamura |
| 2007/0285315 | A1 | * | 12/2007 | Davis et al. .................... 342/377 |
| 2008/0291088 | A1 | * | 11/2008 | Nagai ............................ 342/374 |
| 2010/0225523 | A1 | * | 9/2010 | Mizutani et al. ................ 342/83 |
| 2011/0298676 | A1 | * | 12/2011 | Yanagihara et al. .......... 343/711 |
| 2011/0304508 | A1 | | 12/2011 | Remez et al. |

FOREIGN PATENT DOCUMENTS

WO 2011158056 A1 12/2011

OTHER PUBLICATIONS

Buckley, E., "Ambiguity suppression in a multiple beam radar," RADAR 2002, vol., no., pp. 492,496, Oct. 15-17, 2002.*
Haowen Chen; Xiang Li; Weidong Jiang; Zhaowen Zhuang, "MIMO Radar Sensitivity Analysis of Antenna Position for Direction Finding," Signal Processing, IEEE Transactions on, vol. 60, No. 10, pp. 5201,5216, Oct. 2012.*

* cited by examiner

*Primary Examiner* — John B Sotomayor

(57) ABSTRACT

In an example method, a vehicle is configured with a radar system used to aid in vehicle guidance. The method could include an array of antennas plurality of antennas configured to receive a radar signal. The array of antennas has a respective spacing between the given antenna and an adjacent antenna; however, the plurality of spacings includes at least two different spacings. A portion of the method may be performed by a processor configured to calculate a detection channel, based on a difference between differential phases associated with two antenna pairs in the array. The processor may also calculate an unambiguous angle based on the detection channel and the plurality of antenna spacings. Additionally, the processor may control the radar unit based on the calculated unambiguous angle.

20 Claims, 6 Drawing Sheets

DIRECTION OF ARRIVAL (DOA) ESTIMATION USING MULTIPLE OFFSET RECEIVE CHANNELS

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In a first aspect, an apparatus is provided. The apparatus includes a vehicle configured with a radar system. The method includes an array of antennas plurality of antennas configured to receive a radar signal. The array of antennas has a respective spacing between the given antenna and an adjacent antenna; however, the plurality of spacings includes at least two different spacings. A portion of the method may be performed by a processor configured to calculate a detection channel, based on a difference between differential phases associated with two antenna pairs in the array. The processor may also calculate an unambiguous angle based on the detection channel and the plurality of antenna spacings. Additionally, the processor may control the radar unit based on the calculated unambiguous angle.

In a second aspect, a method is provided. The method includes receiving a radar signal at a radar unit featuring an array of antennas. Each given antenna in the array of antennas has a respective spacing between the given antenna and each adjacent antenna. Further, the array also has a plurality of antenna spacing spacings. The plurality of antenna spacings includes at least two different spacings. The method also includes calculating a detection channel, based on a difference between a first differential phase in a first antenna pair in the array and a second differential phase in a second antenna pair in the array. Additionally, the method features calculating an unambiguous angle based on the detection channel and the plurality of spacings. The method also includes controlling the radar unit based on the unambiguous angle.

In a third aspect, an article of manufacture including a tangible non-transitory computer-readable medium having stored instructions is provided. The instructions are executable by a computer system to cause the computer system to perform functions. The functions include receiving a radar signal at a radar unit featuring an array of antennas. Each given antenna in the array of antennas has a respective spacing between the given antenna and each adjacent antenna. Further, the array also has a plurality of antenna spacing spacings. The plurality of antenna spacings includes at least two different spacings. The instructions also include calculating a detection channel, based on a difference between a first differential phase in a first antenna pair in the array and a second differential phase in a second antenna pair in the array. Additionally, the instructions feature calculating an unambiguous angle based on the detection channel and the plurality of spacings. Finally, the instructions control the radar unit based on the unambiguous angle.

In a fourth aspect, an antenna system for use in a radar may be designed based on the disclosed methods. For example, based on the specifications for a given radar system, such as an frequency of operation and a required unambiguous angle, the maximum antenna spacing to ensure a specified unambiguous angle can be calculated. If the antenna spacing is equal to the required spacing, than the system will have an unambiguous angle at least equal to the specified unambiguous angle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
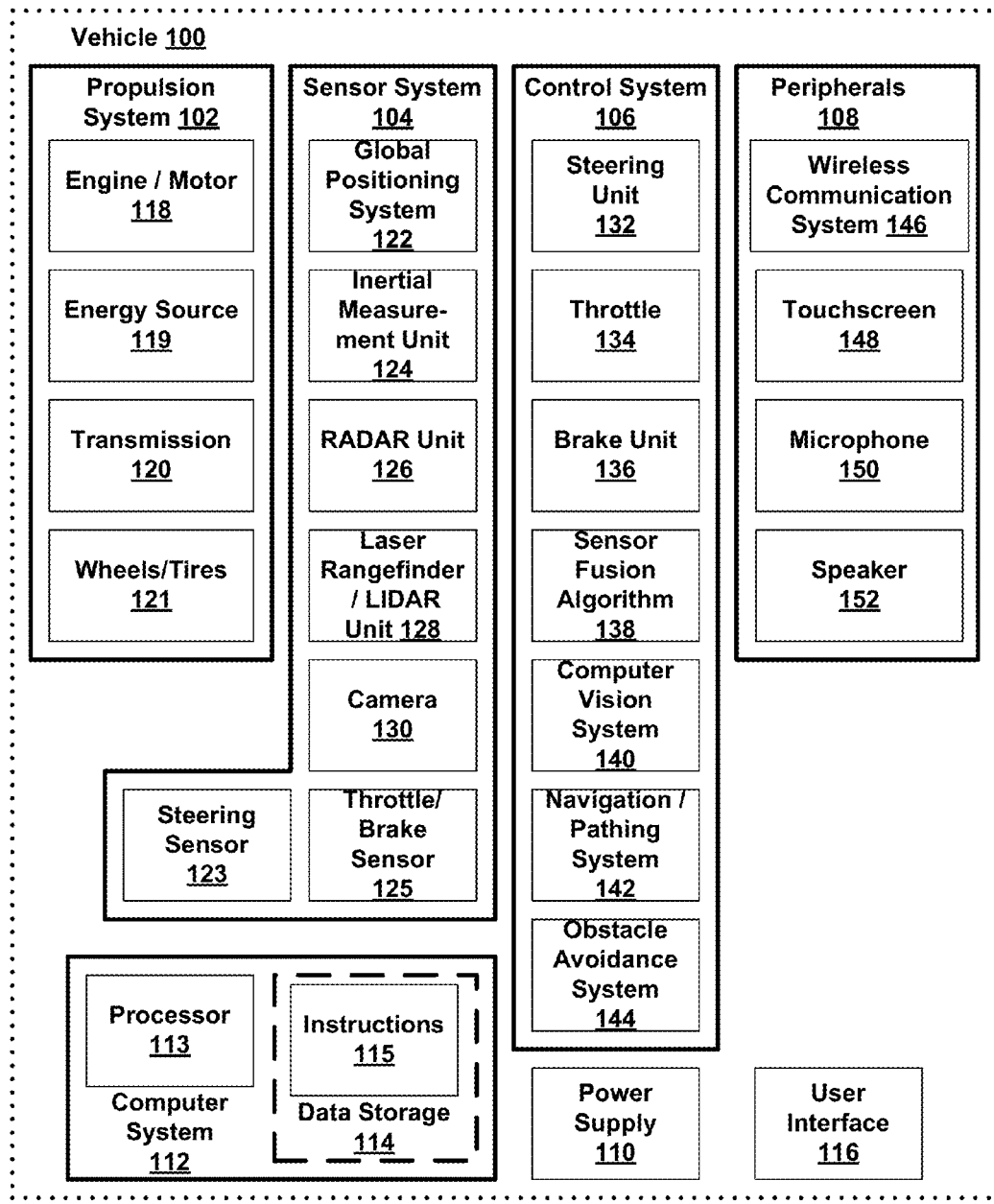
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

1. OVERVIEW

Example embodiments disclosed herein relate to a radar system including direction of arrival (DOA) estimation in an autonomous vehicle. Further, the embodiments disclosed herein may also be used to optimize the radar system based on a specified maximum unambiguous angle.

The radar system of the autonomous vehicle may feature a plurality of antennas. Each antenna may be configured to (i) transmit electromagnetic signals, (ii) receive electromagnetic signals, or (iii) both transmit and receive electromagnetic signals. The antennas may form an array of antenna elements. The array may be able to steer a beam formed by the transmitted electromagnetic signals. Additionally, the array may aid in detecting the direction from which electromagnetic signals are received.

Traditional DOA estimation is fairly straight forward for simple situations where the array has an equal spacing between antenna elements and the wavelength of the transmitted signal is less than or close to the same size as the separation between the phase centers of the receiving antennas. However, for high gain antennas with large apertures, the spacing between the phase centers of each respective antenna must also be large. This large spacing reduces the maximum unambiguous angle for traditional DOA calculations. The reduction in the maximum unambiguous angle generates angular uncertainty in target detection.

Through the utilization of additional receive antennas, the radar system can provide increased confidence in the detection for simple DOA systems by reducing measurement noise. However, increasing the number of receive antennas by itself may not increase the maximum unambiguous angle. By adding additional phase centers, at varying spacing, the system may be optimized to provide a specified maximum unambiguous angle.

Based on a calculation of the phase difference between adjacent antenna elements, and evaluating the phase difference between two adjacent differential channel measurements, an increase in the unambiguous angle can be achieved. By using two differential channel measurements, a new measurement is created that is effectively a differential of two differentials. By incorporating this differential of two differentials, a radar system can be designed with an increased unambiguous angle.

Within the context of the disclosure, the vehicle could be operable in various modes of operation. Depending on the embodiment, such modes of operation could include manual, semi-autonomous, and autonomous modes. In particular, the autonomous mode may provide driving operation with little or no user interaction. Manual and semi-autonomous modes of operation could provide for driving operations with a greater degree of user interaction.

Additionally, the vehicle could be operated in a safety mode. The safety mode could represent an autonomous, semi-autonomous, or manual mode in which the vehicle may be controlled to operate in a safe fashion. Such safety modes of operation could include the vehicle autonomously pulling over to the side of a road and/or the vehicle returning some or all operational control of the vehicle to a driver or another control system.

Some methods disclosed herein could be carried out in part or in full by a vehicle configured to operate in an autonomous mode with or without external interaction (e.g., such as from a user of the vehicle). In one such example, the vehicle may feature a radar system. The radar system may be used for several different purposes. The navigation system of the vehicle may use the radar to locate objects in the path of the vehicle. Additionally, the radar may be used to locate and/or help identify other objects near the vehicle.

During the operation of the radar, at least one antenna in the radar system will transmit a radio signal. The transmitted radio signal propagates away from the antenna and may be reflected by various objects. The reflected radio signals may be received by at least one antenna in the radar system. The radar system may further have a processing unit configured to process the received reflected radio signals. Based on the received reflected radio signals, the processing unit may be able to locate the objects that caused the reflections. The processing unit may be able to calculate an angle and a distance to each object that reflected the radio signal.

In some embodiments, the radar may be configured with multiple antennas. By having multiple antennas, the radar system may be able to more accurately locate objects. In one embodiment, a plurality of antennas may be arranged in an array. The antenna elements in the array may have an even spacing between elements (i.e. the distance between each element is the same) or the antenna may have a non-even spacing. Additionally, the array may be a linear array, a two dimensional array, three dimensional array, conformal array, or other array configuration.

The radar system may also include a computer processor. The processor may be configured to calculate some parameters of the radar system either before the operation of the radar or during the operation of the radar. For example, in one embodiment, the processor is configured to calculate the direction of arrival of an incoming signal. The direction of arrival may correspond to an angle at which a reflected radio signal return to the antennas. Additionally, the radar system may be configured to calculate an unambiguous angle associated with the radar system. The unambiguous angle is a measurement of a region where angle estimations have a high confidence. For example, a target may be located at an angle of 65 degrees in front of the vehicle. However, the unambiguous angle may be 40 degrees. Thus, the measured angle is outside the unambiguous angle region and therefore it may not be accurate. However, if the target is located at an angle of 30 degrees in front of the vehicle, it is within the unambiguous region.

In some embodiments, the calculation of the unambiguous angle may occur during the operation of the radar by a processor located within the vehicle. For example, during the operation of the radar system some parameters of the radar system may change. The radar system may change operation frequency or antenna configuration (e.g. some antennas may be switched on or off). The associated unambiguous angle may change when parameters of the radar system change. Thus, calculating the unambiguous angle during the operation of the radar may be desirable.

The methods disclosed herein could additionally or alternatively be carried out in part or in full by a server, such as one or more nodes of a server network. In an example embodiment, a server or computer may receive an indication of an operation mode of the radar system. Such indications could include any current parameters of the antenna system (e.g., operation frequency, reflected signal information, the on/off state of each antenna). Further, the server may already know (or receive) information related to the antenna position. Such information could include positions and orientation of the various antenna elements. Further, the server may also know (or be able to calculate) the relative spacing between the various antenna elements.

Indication of an operation mode of the radar system could be used to calculate the unambiguous angle during the operation of the radar. The calculated direction of arrival and unambiguous angle may be used in further calculations. These further calculations may include, but are not limited to, calculation of motion parameters for the vehicle, calculation of the position of objects in the field of view of the vehicle, etc.

Also disclosed herein are non-transitory computer readable media with stored instructions. The instructions could be executable by a computing device to cause the computing device to perform functions similar to those described in the aforementioned methods.

It is understood that there are many different specific methods and systems that could be used in an unambiguous angle calculation for the radar system. These specific methods and systems are contemplated herein, and several example embodiments are described below.

2. EXAMPLE SYSTEMS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, calculate an angle and a distance to each object that reflected the radio signal, and calculate an unambiguous angle associated with the angle. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position.

In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (e.g. angle) to different items than are reflecting radar signals back to the radar unit 126. Additionally, the computer system 112 could calculate the unambiguous angle with respect to the target. The unambiguous angle is a measurement of a region where angle estimations have a high confidence (i.e. the angle prediction is highly accurate). Both the calculated direction (e.g. angle) and the unambiguous angle value could be based on several factors including radar operation frequency, reflected signal information, the on/off state of each antenna.

For instance, in a first scenario, the radar unit 126 may be designed based on a pre-determined frequency of operation and a pre-determined unambiguous angle limit. Because the angle to at least a subset of the various reflected signals, the unambiguous angle for each of the reflected signals, the spacing of the antenna elements, and the frequency of operation are all related based on mathematical formulas, the radar unit 126 may be designed with specific operation values in mind. For example, a given radar system may have a 75 Gigahertz (GHz) operation frequency and a desired unambiguous angle limit of 30 degrees. Thus, the radar spacing may be designed based on these criteria. In this specific embodiment, the maximum spacing of antenna elements may be 8 millimeters. The specifics of the unambiguous angle calculation is disclosed herein.

In a second scenario, if the vehicle 100 is traveling on a road, the radar unit 126 may be transmitting radio waves to interrogate the environment surrounding the vehicle. When the radar receives reflected radios waves, the computer system 112 may calculate an angle to at least a subset of the various reflected signals. Further, the radar may calculate an unambiguous angle for each of the reflected signals for which the angle was calculated.

In a third scenario, if the vehicle 100 is traveling down the road, the radar unit 126 may vary the frequency of operation of the radar. Because both the angle to at least a subset of the various reflected signals and the unambiguous angle for each of the reflected signals is dependent on the frequency of operation, the computer system 112 may revise both calculations.

In a fourth scenario, if the vehicle 100 is traveling down the road, the radar unit 126 may vary which antennas in the radar unit 126 are operational. Because both the angle to at least a subset of the various reflected signals and the unambiguous angle for each of the reflected signals may be dependent the spacing of the antenna elements, the computer system 112 may revise both calculations.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
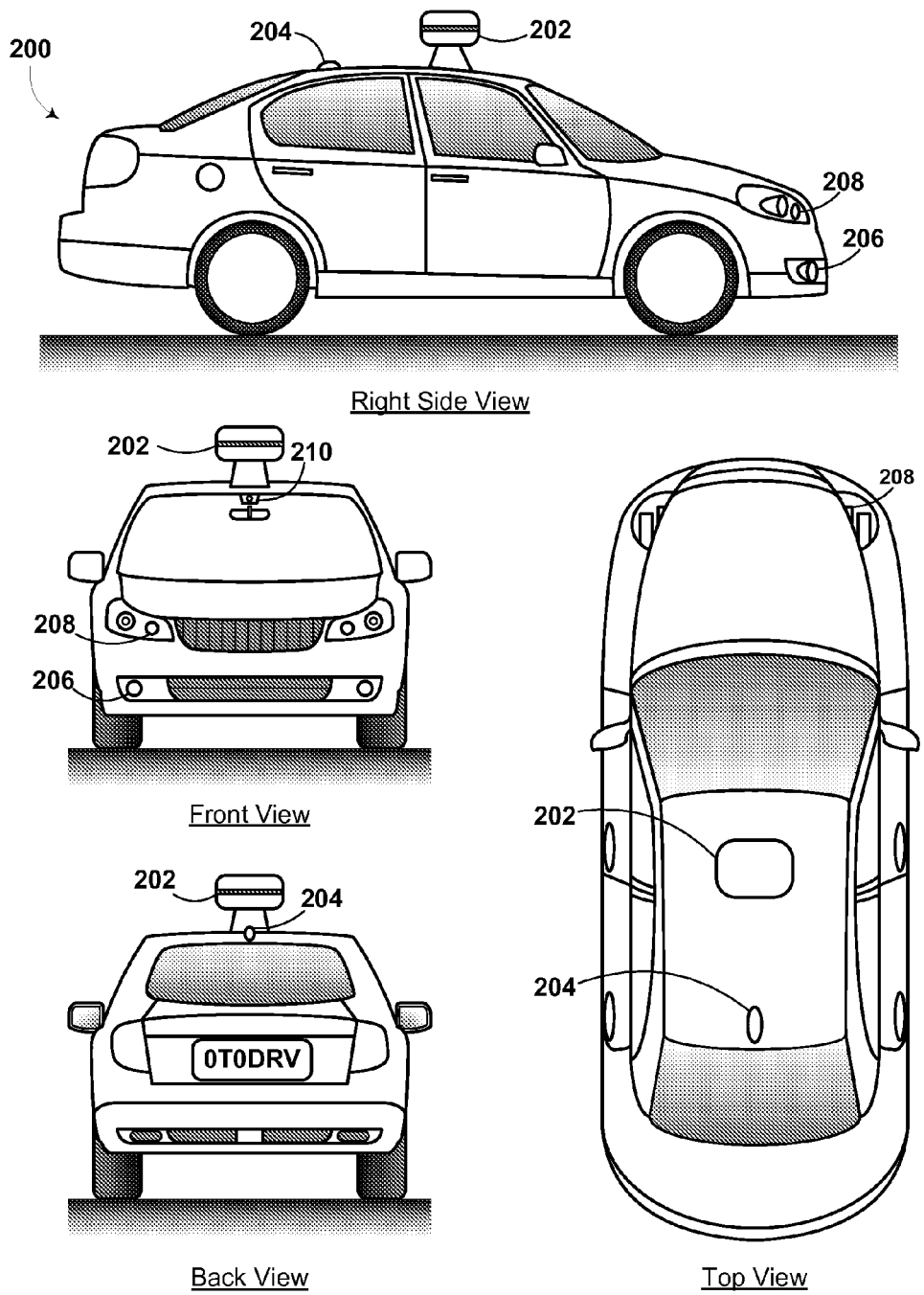
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
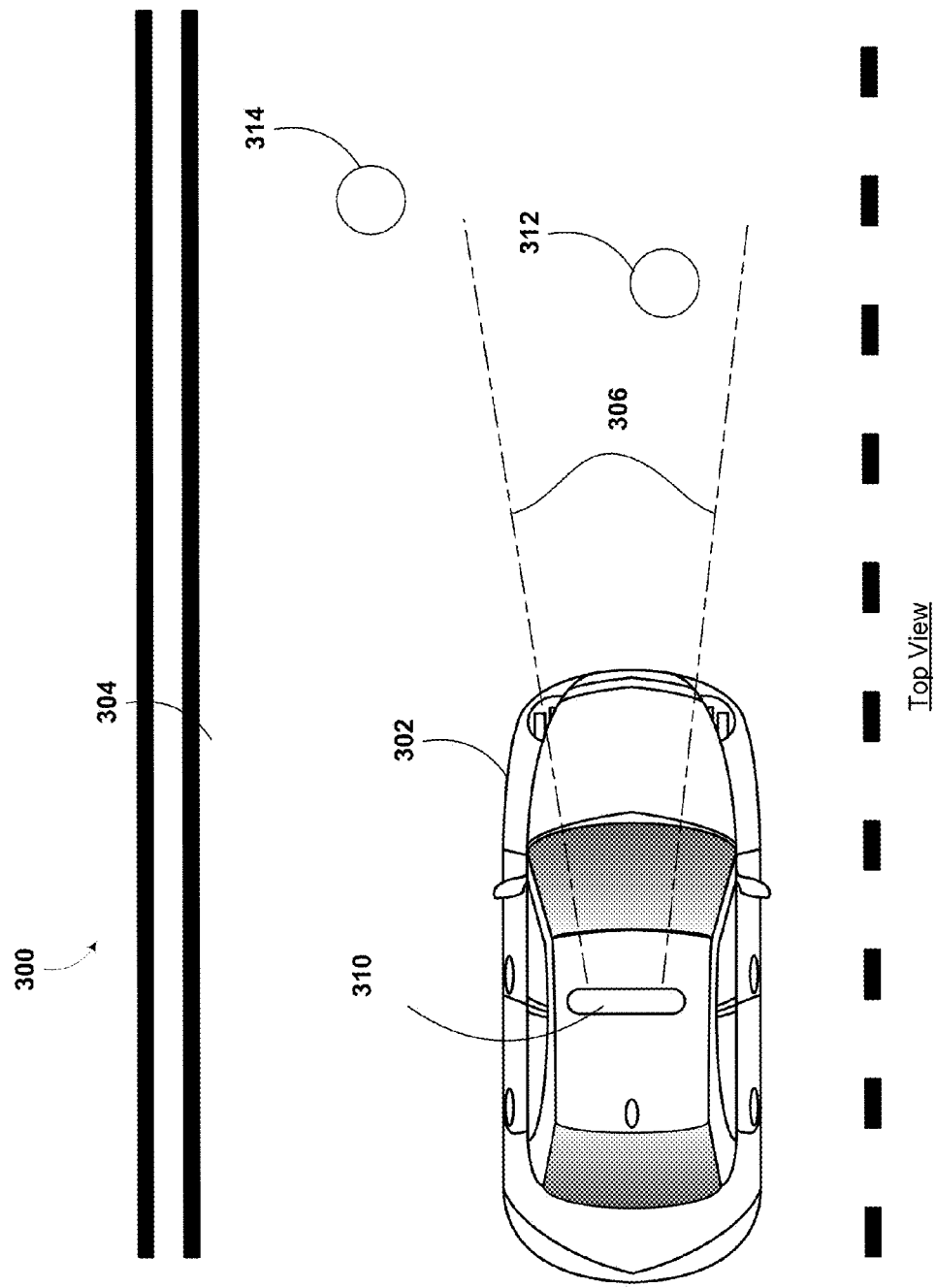
FIG. 3A is a top view of an autonomous vehicle operating scenario, according to an example embodiment.

FIG. 3A illustrates a scenario 300 involving a vehicle 302 traveling down a roadway 304. Vehicle 302 could be operating in an autonomous mode. Further, the vehicle 302 may be configured with a radar unit 310. The radar unit 301 may have an associated unambiguous angle 306. In one example embodiment, there may be two targets 312 and 314 in front of the vehicle 302. A first target 312 may be within the unambiguous angle 306 of the radar unit 310. The second target 314 may be outside the unambiguous angle 306 of the radar unit 310. The radar unit 310 may be able to provide an accurate estimation of the angle to the first target 312. However, because the second target 314 is outside the unambiguous angle 306, accurate estimation of the angle may not be possible.

Figure 3B:
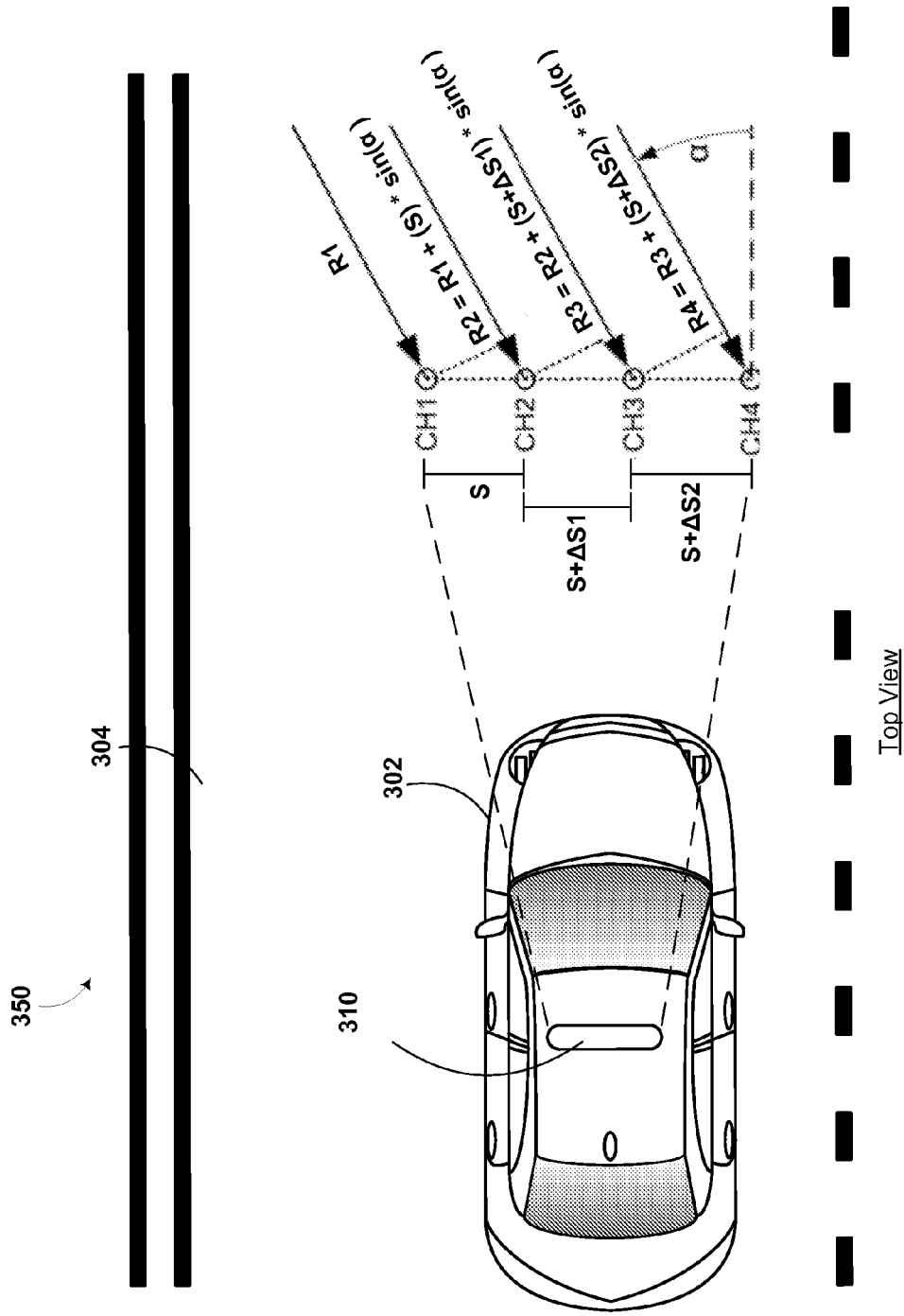
FIG. 3B is a top view of an autonomous vehicle operating scenario, according to an example embodiment.

FIG. 3B illustrates a scenario 350 involving a vehicle 302 traveling down a roadway 304. Vehicle 302 could be operating in an autonomous mode. Further, the vehicle 302 may be configured with a radar unit 310. The radar unit 301 may be configured with a plurality of antenna elements. In the particular embodiment shown in FIG. 3, the radar unit 310 may include four antennas. FIG. 3 shows an exploded view of radar unit 310 including antennas CH1, CH2, CH3 and CH4 on the right hand side of the Figure. Additionally, antenna CH1 and CH2 may be spaced apart by a distance S, antennas CH2 and CH3 may be spaced apart by a distance S+ΔS1, and antennas CH3 and CH4 may be spaced apart by a distance S+ΔS2.

The direction of arrival from a reflected signal to the antenna array is given by the angle α. The angle α may be assumed to be the same for each element of the antenna array due to the relatively narrow antenna spacing compared to the distance to the reflection target(s). Further, each respective antenna has a distance from the antenna to the target that has reflected the radio signal. The distance from antenna CH1 to the target may be given by $R_1$. The distance from antenna CH2 to the target is equal to $R_2=R_1+S*\sin(\alpha)$. The distance from antenna CH3 to the target is equal to $R_3=R_2+(S+\Delta S_1)*\sin(\alpha)$. The distance from antenna CH4 to the target is equal to $R_4=R_3+(S+\Delta S_2)*\sin(\alpha)$.

Additionally, each antenna may receive a reflected radar signal. This received signal may be known as a Video Phase History (VPH). For each antenna the VPH will have a similar amplitude component, A(R), but the phase term for each respective antenna will be different. The A(R) function represents attenuation due to the total distance traveled by the radar pulse (i.e. the distance from the transmitter, to the reflector, and back). The function A(R) could be more explicitly shown as $A(R_T+R_X)$, where X corresponds to a given channel. Therefore, for channel 1, the expression would be $A(R_T+R_1)$. However, the small variations in range due to the distance difference between the reflector and the antenna elements have a negligible impact on channel to channel amplitude variations; thus, a A(R) could be considered constant across all channels. The value of $R_T$ is not necessarily the same as the value $R_X$ as $R_T$ defines the length of the vector that points from the transmitting antenna phase center to the reflecting surface phase center. Conversely, $R_X$ defines the length of the vector that points from the reflecting surface phase center to the receive channel antenna phase center.

The initial calculation of the 2π unambiguous range for $\Phi_{12}$, as will be shown below, is the same as the classic calculation for grating lobes in an uniform array. The reason for the 2π upper boundary for phase variations is that the true unwrapped phase for the radar pulse is not available. Instead, what is returned is a family of potential ranges (unwrapped phases) with the only valuable information in the phase remainder. The differential phase channel quantities, defined by Φ below, are only resolvable using methods that modulo the answer with either π or 2π. If a radar system could accurately measure the exact length of the receive pulse from an individual scatterer, at each receive antenna, this would not be a problem. For example, in laser based Light Detection and Ranging (LIDAR) systems, this method is used.

In the methods disclosed herein, the small (sub-wavelength) variations in range is related directly to the angle of the received radar pulse. These sub-wavelength variations are typically much less than the radar range resolution, and as such will have many possible numbers of wavelengths that could be traversed in one typical radar range bin. In one example embodiment, variations may be less than 4 millimeters (mm) while the radar range resolution may be 0.2 to 1 meters (M). For this example, when the range resolution is 0.2 M, 50 wavelengths can correspond to the same range bin. An assumption can be made that the reflected signal captured by each receive antenna contains the same number of integer wavelengths as each other receive antenna. When this assumption is invalid, a new unambiguous angle boundary occurs. By using non uniform phase center spacing these new ambiguous angle boundaries can be reduced or eliminated.

As the detection channel is high gain for small phase differences, uncorrelated phase errors may also multiplied by the detection channel gain. The detection channel gain may be set to the lowest required level when the required unambiguous angle is designed to cause the detection channel to output 2π (a complete radian cycle). Thus, small errors in phase measurements have minimal impact on the accuracy of the detection channel.

The phase term of each VPH is based on the distance from each respective antenna to the target that is reflecting the radar signal. In the expression below, c represents the speed of light, ω represents the frequency of the radar signal (measured in radians per second), and i represents the square root of −1. In one example embodiment, the VPH at each antenna of a 4 channel DOA determination radar system can be defined as:

$$VPH_1(R_1) = A(R)e^{i\omega\frac{R_T+R_1}{c}} \quad R_1 = \text{Range}$$

$$VPH_2(R_2) = A(R)e^{i\omega\frac{R_T+R_2}{c}} \quad R_2 = R_1 + S*\sin(\alpha)$$

$$VPH_3(R_3) = A(R)e^{i\omega\frac{R_T+R_3}{c}} \quad R_3 = R_2 + (S+\Delta S_1)*\sin(\alpha)$$

$$VPH_4(R_4) = A(R)e^{i\omega\frac{R_T+R_4}{c}} \quad R_4 = R_3 + (S+\Delta S_2)*\sin(\alpha)$$

Each VPH has an associated phase component, ϕ. Each phase component for the example embodiment is given below. For the above example, the following expressions describe the phase component. In the first column, the raw phase term is given and the second column contains the phase term with the associated substitution for the range from each respective antenna to the target that is reflecting the radar signal.

$$\varphi_1(\alpha) = \omega * \frac{R_T + R_1}{c} \quad \varphi_1(\alpha) = \omega * \frac{R_T + R_1}{c}$$

$$\varphi_2(\alpha) = \omega * \frac{R_T + R_2}{c} \quad \varphi_2(\alpha) = \omega * \frac{R_T + R_1 + S * \sin(\alpha)}{c}$$

$$\varphi_3(\alpha) = \omega * \frac{R_T + R_3}{c} \quad \varphi_3(\alpha) = \omega * \frac{R_T + R_1 + S * \sin(\alpha) + (S + \Delta S_1) * \sin(\alpha)}{c}$$

$$\varphi_4(\alpha) = \omega * \frac{R_T + R_4}{c} \quad \varphi_4(\alpha) = \omega * \frac{R_T + R_1 + S * \sin(\alpha) + (S + \Delta S_1) * \sin(\alpha) + (S + \Delta S_2) * \sin(\alpha)}{c}$$

The phase component associated with each VPH may be simplified further, as shown below.

$$\varphi_1(\alpha) = \omega * \frac{R_T + R_1}{c}$$

$$\varphi_2(\alpha) = \omega * \frac{R_T + R_1 + S * \sin(\alpha)}{c}$$

$$\varphi_3(\alpha) = \omega * \frac{R_T + R_1 + (2S + \Delta S_1) * \sin(\alpha)}{c}$$

$$\varphi_4(\alpha) = \omega * \frac{R_T + R_1 + (3S + \Delta S_1 + \Delta S_2) * \sin(\alpha)}{c}$$

Based on the simplified phase component associated with each VPH, a differential channel phase term $\Phi$ can be calculated. The differential channel phase is the phase difference between two antennas. Here, differential channel phases are calculated for adjacent antennas in the system. For the current example, the following differential receive channel phases may be calculated.

$$\Phi_{12}(\alpha) = \varphi_2(\alpha) - \varphi_1(\alpha) = \omega * \frac{R_T + R_1 + S * \sin(\alpha)}{c} - \omega * \frac{R_T + R_1}{c}$$

$$\Phi_{23}(\alpha) = \varphi_3(\alpha) - \varphi_2(\alpha) = \omega * \frac{R_T + R_1 + (2S + \Delta S_1) * \sin(\alpha)}{c} - \omega * \frac{R_T + R_1 + S * \sin(\alpha)}{c}$$

$$\Phi_{34}(\alpha) = \varphi_4(\alpha) - \varphi_3(\alpha) = \omega * \frac{R_T + R_1 + (3S + \Delta S_1 + \Delta S_2) * \sin(\alpha)}{c} - \omega * \frac{R_T + R_1 + (2S + \Delta S_1) * \sin(\alpha)}{c}$$

For each differential channel phase term $\Phi$ in the example, the following substitution can be made in each expression $$\frac{\omega}{c} = \frac{2\pi}{\lambda}.$$

This substitution expression indicates that the ratio of the frequency of the radar signal ($\omega$) divided by the speed of light (c) is equal to two pi ($2\pi$) divided by the wavelength ($\lambda$) of the radar signal.

$$\Phi_{12}(\alpha) = \frac{2\pi}{\lambda} S \sin(\alpha)$$

$$\Phi_{23}(\alpha) = \frac{2\pi}{\lambda} (S + \Delta S_1) \sin(\alpha)$$

$$\Phi_{34}(\alpha) = \frac{2\pi}{\lambda} (S + \Delta S_2) \sin(\alpha)$$

The unambiguous angle of the differential channel phase term $\Phi$ is where $\Phi = 2\pi$. Thus, in one example, the expression for the unambiguous angle is given below.

$$\Phi_{12}(\alpha) = \frac{2\pi}{\lambda} S \sin(\alpha) = 2\pi$$

$$\frac{S}{\lambda} \sin(\alpha) = 1$$

$$\alpha = \mathrm{asin}\left(\frac{\lambda}{S}\right)$$

Thus, based on the differential channel phase term, the unambiguous angle over which a signal can be detected is given by $$\alpha = \mathrm{asin}\left(\frac{\lambda}{S}\right).$$

In one example, the wavelength ($\lambda$) may be 4 millimeters (mm) and the spacing (S) may be 26 mm. Thus, when the values are used in the above equation, the unambiguous angle is 8.8 degrees. This may be too small for some practical applications.

In order to increase the unambiguous angle, a new differential quantity can be created that is effectively the difference between two differentials. This differential of differentials will be referred to as the detection channel, $\Theta$. For example, the $\Theta_{1223}$ direction channel is the differential between the differential of channels 1 and 2 and between channels 2 and 3. In this example, because there is a common receive channel between the two differentials, this $\Theta_{1223}$ direction channel is referred to as a single wide detection channel. The expression for each of the detection channels associated with the current example are is defined as:

$$\Theta_{1223}(\alpha) = \Phi_{23}(\alpha) - \Phi_{12}(\alpha) = \frac{2\pi}{\lambda}(S + \Delta S_1)\sin(\alpha) - \frac{2\pi}{\lambda} S \sin(\alpha)$$

$$\Theta_{1223}(\alpha) = \frac{2\pi}{\lambda} \Delta S_1 \sin(\alpha)$$

$$\Theta_{2334}(\alpha) = \Phi_{34}(\alpha) - \Phi_{23}(\alpha) = \frac{2\pi}{\lambda}(S + \Delta S_2)\sin(\alpha) - \frac{2\pi}{\lambda}(S + \Delta S_1)\sin(\alpha)$$

$$\Theta_{2334}(\alpha) = \frac{2\pi}{\lambda}(\Delta S_2 - \Delta S_1)\sin(\alpha)$$

Further, an additional detection channel can be calculated. For example, $\Theta_{1234}$ is the difference between the phase differential between antennas 1 and 2 and the differential between antennas 3 and 4. Because this detection channel measures the differential across two separate differential receive channels, it is called a double wide detection channel. The expression for $\Theta_{1234}$, one example double wide detection channel, is given below.

$$\Theta_{1234}(\alpha) = \frac{2\pi}{\lambda}(\Delta S_2)\sin(\alpha)$$

Based on the above single wide detection channels, a new unambiguous angle can be calculated. For the $\Theta_{1223}$ detection channel, the expression for the unambiguous angle is where the detection channel equals $2\pi$. Due the new detection channel calculation, the unambiguous angle becomes a function of $\Delta S_1$, the adjusted (or uneven) spacing between antenna elements.

$$\Theta_{1223}(\alpha) = \frac{2\pi}{\lambda}\Delta S_1 \sin(\alpha) = 2\pi$$

$$\frac{\Delta S_1}{\lambda}\sin(\alpha) = 1$$

$$\alpha = \operatorname{asin}\left(\frac{\lambda}{\Delta S_1}\right)$$

In the example above, if a given wavelength is 4 mm and the adjusted spacing $\Delta S_1$ is 8 mm, the unambiguous angle is equal to 30 degrees. Just through the above calculation, and the non-equal spacing, the unambiguous angle was increased from about 8 degrees in the first example using differential receive channel to 30 degrees in the current example when using detection channels. The above calculation is one example of the calculation of an unambiguous angle. Each detection channel in a system may have an associated unambiguous angle calculate similar to the calculation above.

In a further example, a different single wide detection channel can be used to calculate an unambiguous angle. Just like for the single wide detection channel, the expression for the double wide detection channel is set equal to $2\pi$.

$$\frac{2\pi}{\lambda}(\Delta S_2 - \Delta S_1)\sin(\alpha) = 2\pi$$

$$\frac{\Delta S_2 - \Delta S_1}{\lambda}\sin(\alpha) = 1$$

$$\alpha = \operatorname{asin}\left(\frac{\lambda}{\Delta S_2 - \Delta S_1}\right)$$

In yet another example, the double wide detection channel can be used to calculate an unambiguous angle. Just like for the single wide detection channel, the expression for the double wide detection channel is set equal to $2\pi$.

$$\Theta_{1234}(\alpha) = \frac{2\pi}{\lambda}(\Delta S_2)\sin(\alpha) = 2\pi$$

$$\frac{\Delta S_2}{\lambda}\sin(\alpha) = 1$$

$$\alpha = \operatorname{asin}\left(\frac{\lambda}{\Delta S_2}\right)$$

Based on the design requirements of a specific radar system, the parameters of wavelength, antenna spacing, and unambiguous angle can be calculated. For instance, in one radar system, there may be specific requirements for the unambiguous angle and the operation frequency, thus the required antenna spacing can be determined based on the above equations. Additionally, in some embodiments, various parameters of the radar system may be dynamically altered. For example, the radar system may be able to change the frequency of operation, or antenna spacing. Thus, the unambiguous angle would responsively change.

In some additional embodiments, the various of parameters of the radar system may be designed based on target criteria. For example, a given radar system may have a 75 Gigahertz (GHz) operation frequency and a desired unambiguous angle limit of 30 degrees. Using the disclosed methods, an antenna spacing may be calculated to ensure a predetermined unambiguous angle limit for the radar during its operation. Further, the above example is only one way to design a radar system. Based on a required set of parameters, the disclosed methods can be used to determine the other parameters required for the system's operation.

3. EXAMPLE METHODS

Figure 4:
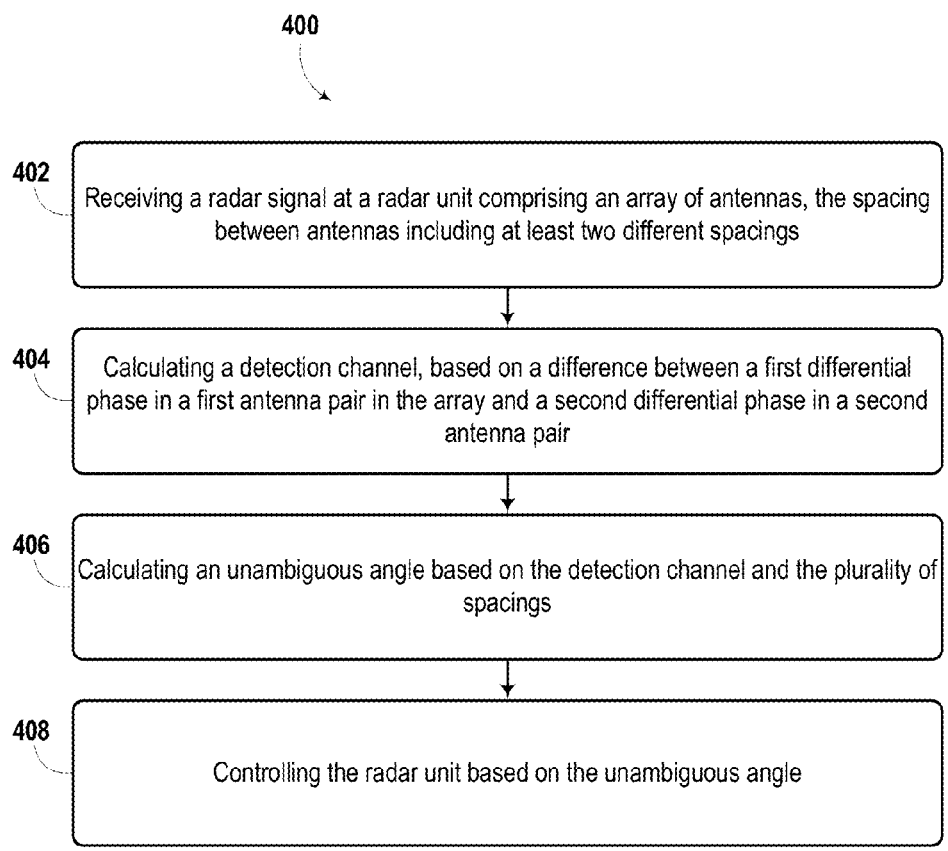
FIG. 4 shows a method, according to an example embodiment.

A method 400 is provided for receiving an incoming signal with a set of antennas, calculating a detection channel, and returning an estimated unambiguous angle based on the detection channel. The method could be performed using any of the apparatus shown in FIGS. 1-3 and described above; however, other configurations could be used. FIG. 4 illustrates the steps in an example method, however, it is understood that in other embodiments, the steps may appear in different order and steps could be added, subtracted, or modified. Additionally, the steps may be performed in a linear manner (as shown) or may be performed in a parallel manner (not shown).

Step 402 includes the vehicle receiving a radar signal at a radar unit with an array of antennas. The vehicle described in this method could be the vehicle 100 and/or vehicle 200 as illustrated and described in reference to FIGS. 1 and 2, respectively. Receiving the radar signal could include receiving radio signals that are reflected from objects in the field of view of the radar system. A processor in the radar system may convert the received radar signals into data to relay for further processing. For example, the radar system may transmit a signal and receive a set of reflected signals back. The radar system may further identify distance and direction information to each object that causes reflections back to the vehicle. Depending upon the embodiment, the reflected signals may be processed fully or in part by a server and communicated to the vehicle.

Each antenna in the array has a respective phase associated with the antenna. Each pair of antennas in the antenna array has both a separation distance and a differential channel phase with each other respective antenna in the array. In some embodiments, the array may be a non-linear array. Thus, for a non-linear array, the spacing between adjacent antenna elements is not constant. In some embodiment, the system may alter which antennas in the set of antennas are turned on. Thus, the calculation of the unambiguous angle may be revised based on the set of antennas that are currently active. In further embodiments, the system may alter the frequency of operation. Upon the frequency of operation changing, the unambiguous angle may be revised.

Step 404 includes calculating a detection channel. The detection channel is the difference between two different differential channel phases. The detection channel is the same as the detection channel described with respect to $\Theta$ above. For example, there may be a single-wide detection channel or a double-wide detection channel. For a single-wide detection channel, one antenna element is in common in the each differential channel phase used to calculate the detection channel. For a double-wide detection channel, no antenna elements are in common in the each differential channel phase used to calculate the detection channel.

Step 406 includes calculating an estimated unambiguous angle based on the detection channel and the plurality of antenna spacings. In some embodiments, the unambiguous angle is calculated based on setting the detection channel equal to $2\pi$, as discussed previously. Solving the expression, the unambiguous angle may be defined in terms of parameters of the radar system.

In a first embodiment, the unambiguous angle is a function of the operation frequency of the radar and the antenna element spacing. In a second embodiment, the unambiguous angle is a function of the operation frequency of the radar and the difference between antenna element spacing between two different pairs of antennas. For example, the spacing between antenna 1 and antenna 2 may be S and the spacing between antenna 2 and antenna 3 may be S+a. Thus, in the second embodiment, the unambiguous angle is a function of the operation frequency of the radar and the value a.

Step 408 includes controlling the radar unit based on the unambiguous angle. The radar unit may include a DOA calculation. The DOA calculation may use the unambiguous angle to assist in the calculation of the DOA. Additionally, the radar unit may calculate a confidence level associated with the DOA calculation based on the unambiguous angle. In other embodiments, the radar unit may return the unambiguous angle to further processing systems of the vehicle. Further, the radar unit may have other calculations in which it may use the calculated unambiguous angle.

In yet some further embodiments, the radar system may be designed based on set of design parameters. Thus, if a frequency of operation and a desired unambiguous angle are both known, the disclosed methods can calculate the required antenna spacing. In different embodiments, only the operation frequency is unknown. Thus, the antenna spacing and the desired unambiguous angle may define an appropriate operation frequency. As disclosed, the calculation of the unambiguous angle results in an equation with multiple variables. Depending on the specific design criteria, various different parameters of the system may be calculated.

Figure 5:
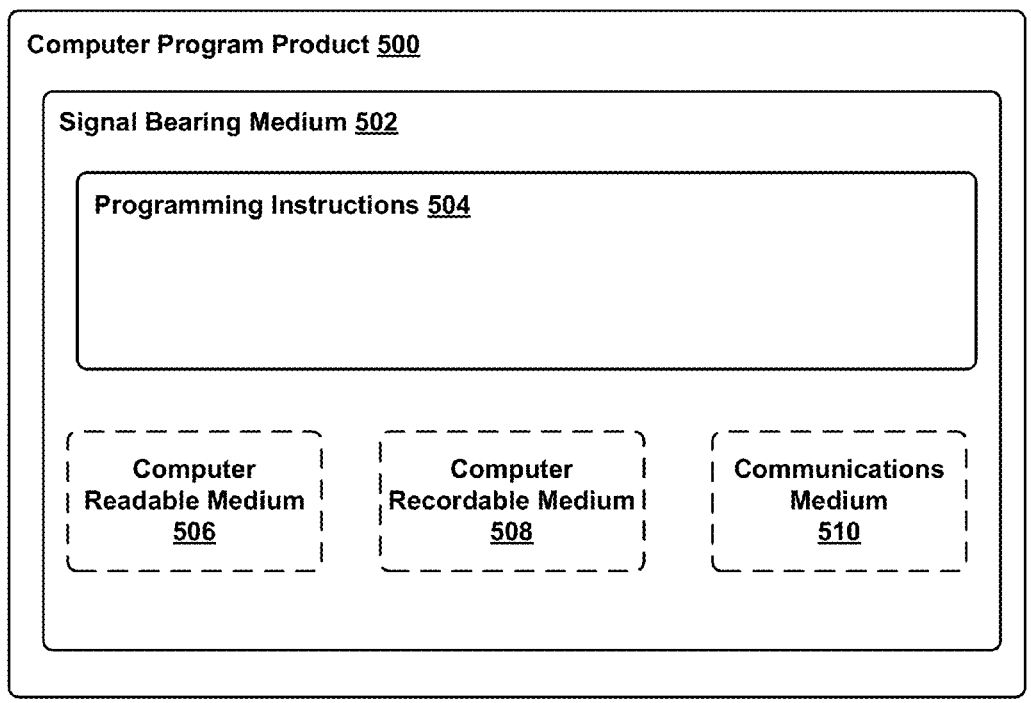
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A system comprising:
   a radar unit comprising a plurality of antennas, wherein each given antenna in the plurality of antennas has a respective spacing between the given antenna and an adjacent antenna, to define a plurality of spacings, the plurality of spacings including at least two different spacings;
   a processor configured to:
      calculate at least two relative phases between at least two antenna pairs in the plurality of antennas,
      calculate a detection channel based on the two relative phases,
      calculate an unambiguous angle based on the detection channel and the plurality of spacings, and
      operate the radar unit based on the unambiguous angle.

2. The system of claim 1, wherein the calculation of the unambiguous angle is also based on a frequency of operation of the radar unit.

3. The system of claim 1, wherein the plurality of antennas form an array.

4. The system of claim 3, wherein the array is two dimensional.

5. The system of claim 3, wherein the array is one dimensional.

6. The system of claim 1, wherein one or more of the antennas in the plurality of antenna are disabled.

7. The system of claim 2, wherein the processor is configured to change the frequency of operation of the radar unit.

8. A method comprising:
   receiving a radar signal at a radar unit comprising an array of antennas, wherein each given antenna in the array of antennas has a respective spacing between the given antenna and an adjacent antenna, to define a plurality of spacings, the plurality of spacings including at least two different spacings;
   calculating a detection channel, based on a difference between a first differential phase in a first antenna pair in the array and a second differential phase in a second antenna pair in the array;

calculating an unambiguous angle based on the detection channel and the plurality of spacings; and controlling the radar unit based on the unambiguous angle.

9. The method of claim 8, wherein the calculation of the unambiguous angle is also based on a frequency of operation of the radar unit.

10. The method of claim 8, further comprising disabling one or more antennas in the array.

11. The method of claim 10, further comprising calculating a revised unambiguous angle based on the one or more antennas being disabled.

12. The method of claim 8, further comprising changing the frequency of operation of the radar unit.

13. The method of claim 12, further comprising calculating a revised unambiguous angle based on the frequency of operation being changed.

14. A non-transitory computer readable medium having stored therein instructions executable by a computing device to cause the computing device to perform functions comprising:

instructions for receiving a radar signal at a radar unit comprising an array of antennas, wherein each given antenna in the array of antennas has a respective spacing between the given antenna and an adjacent antenna, to define a plurality of spacings, the plurality of spacings including at least two different spacings;

instructions for calculating a detection channel, based on a difference between a first differential phase in a first antenna pair in the array and a second differential phase in a second antenna pair in the array;

instructions for calculating an unambiguous angle based on the detection channel and the plurality of spacings; and instructions for controlling the radar unit based on the unambiguous angle.

15. The computer readable medium of claim 14, wherein the array is two dimensional.

16. The computer readable medium of claim 14, wherein the array is one dimensional.

17. The computer readable medium of claim 14, further comprising instructions for disabling on or more antennas in the array.

18. The computer readable medium of claim 14, further comprising instructions for changing the frequency of operation of the radar unit.

19. The computer readable medium of claim 18, further comprising instructions for calculating the unambiguous angle based on a frequency of operation of the radar unit.

20. The computer readable medium of claim 17, further comprising instructions for calculating a revised unambiguous angle based on the one or more antennas being disabled.

* * * * *